Nov. 29, 1955  G. L. BOEHM  2,724,920
FISH LANDING NET

Filed March 23, 1953  2 Sheets-Sheet 1

INVENTOR
George L. Boehm

ATTORNEY
Allen C. Buhler

Nov. 29, 1955  G. L. BOEHM  2,724,920
FISH LANDING NET
Filed March 23, 1953  2 Sheets-Sheet 2
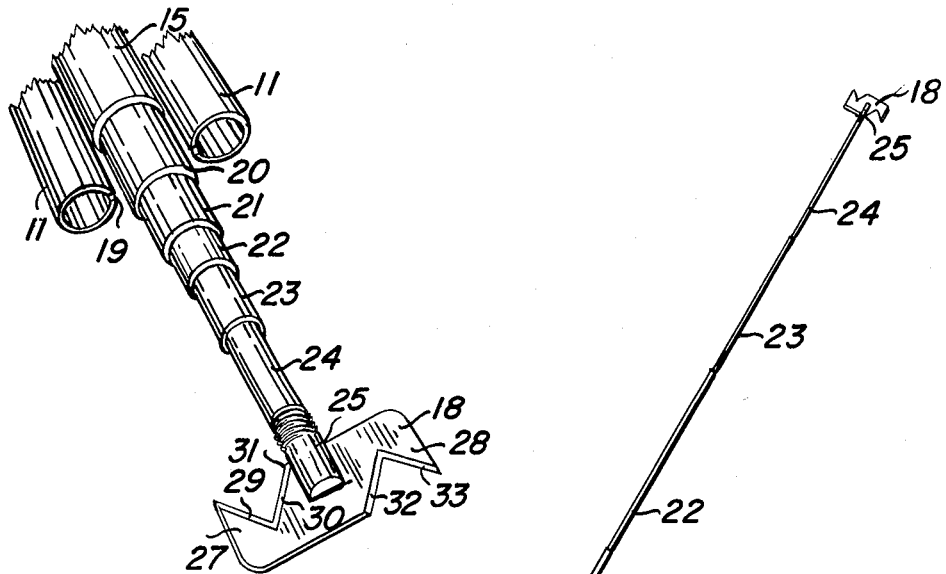
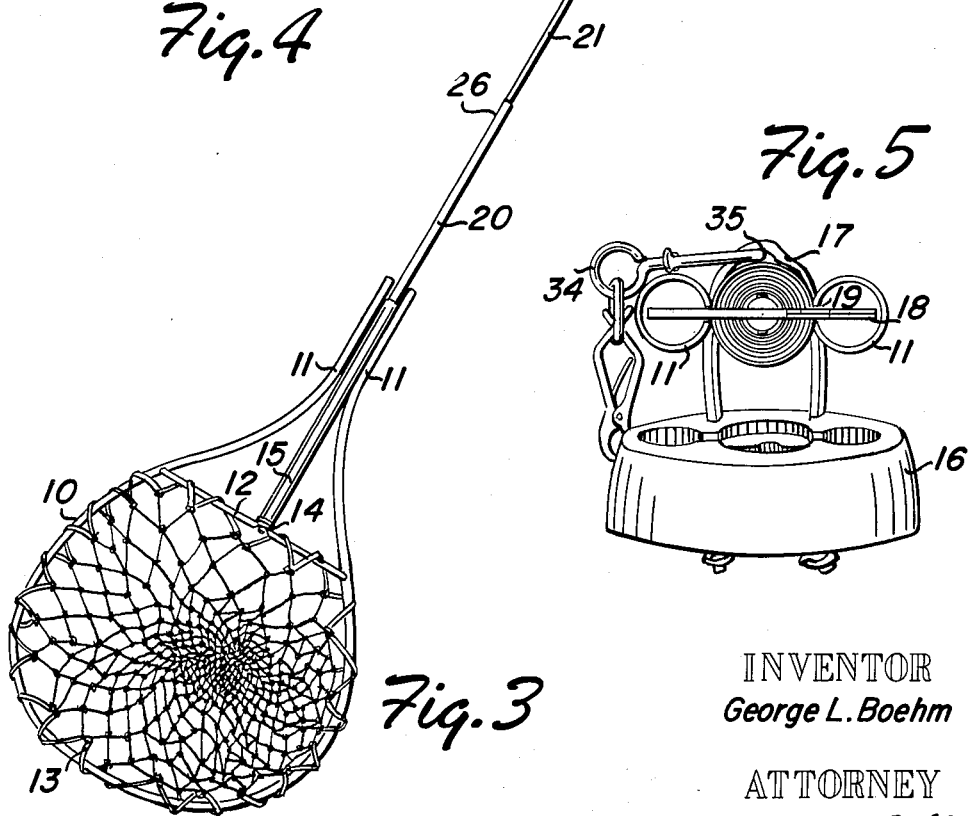
INVENTOR
George L. Boehm
ATTORNEY
Allen C. Buhler

United States Patent Office 2,724,920
Patented Nov. 29, 1955

2,724,920
FISH LANDING NET
George L. Boehm, Racine, Wis.

Application March 23, 1953, Serial No. 343,843

1 Claim. (Cl. 43—12)

This invention relates to a fish landing net and, more particularly, to a fish landing net having a handle portion capable of projection in telescopic fashion which carries a device for retrieving baits or lures.

Considerable difficulty is usually experienced in fishing, in that the hooks on baits or lures quite often are caught on logs, projecting limbs of trees or other objects. Since the line is flexible, it is practically impossible to release the hooks and, as a result, the line is usually broken and the lure is lost.

In the patent to Munger, U. S. No. 1,851,370 issued March 29, 1932, a fish-hook releaser was disclosed which embodied a long pole carrying on the tip thereof a device for releasing lures. In order to suffice the purpose intended, such a pole must be of considerable length, thus providing a most unwieldy and cumbrous additional article of paraphernalia.

Substantially all fishermen, as part of their standard gear, are equipped with a fish landing net. It is the object of this invention to provide a fish landing net having a handle portion which may be quickly and easily extended in telescopic fashion, thereby providing an extention of considerable length which carries on the extremity of the extended portion a device for releasing baits and lures.

A further object of the invention is to provide a net frame which is fashioned in part circular shape, then continued to provide components of the handle portion.

Another object of the invention is to provide a lure retriever having a tool which will recess itself safely in the handle portion when the retriever pole is compressed within the handle.

Another object of the invention is to provide a cap for the retriever tool, when not in operating position, which will remain securely in place.

A still further object is to provide the device with means for hooking it to the harness or clothing of the user.

Other objects and advantages will more fully appear from the following description taken in connection with the accompanying drawing, in which:

Fig. 3 is a perspective view of the fish landing net with the bait and lure retriever extended therefrom.

Fig. 4 is a perspective view of the retriever tool and a portion of the retriever rod.

Fig. 5 is an end view of the handle portion with the cap removed and the lure retriever in compressed position.

Similar numerals refer to similar parts throughout the several views.

Figure 1:
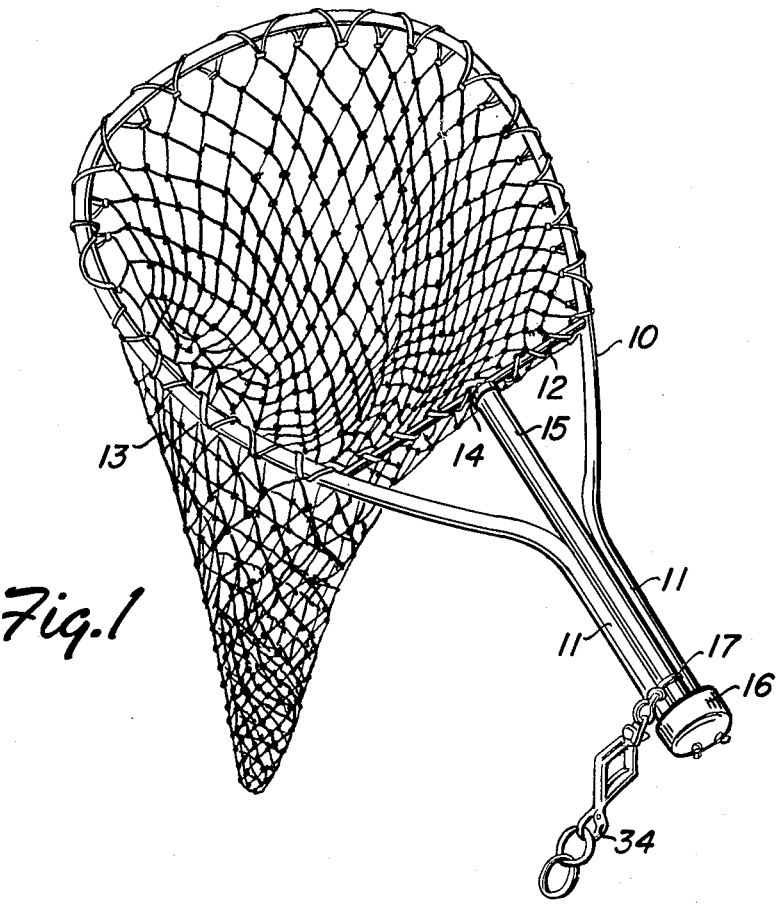
Fig.1 is a perspective view of the fish landing net.

Referring to the drawing, a hoop or frame 10 of the landing net is made of wood or metal tubing. The frame 10 is bent in part circular shape and terminates in a pair of hollow shafts 11. A crosspiece 12 is positioned for support between the converging handle frame 10. Secured about the frame 10 to the point of juncture with the crosspiece 12 and thence about it is a net bag 13. Attached at approximately the middle 14 of the crosspiece and extending to a position between the shafts 11 is a hollow tube 15. A cap 16 made of rubber or similar material covers the ends of the shafts 11. This cap 16 may be securely but detachably carried on the device by a cord 17, which is positioned around the tube 15, and between the shafts 11.

Figure 2:
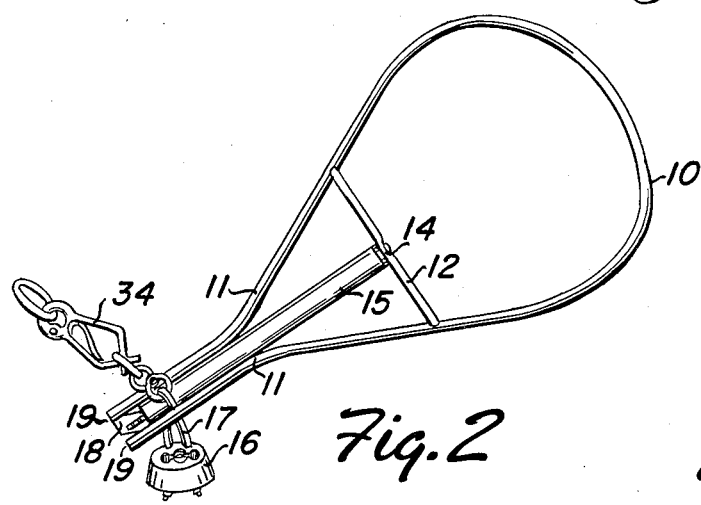
Fig. 2 is a top plan view of the fish landing net frame with the bait and lure retriever in compressed position and the cap removed.

As seen in Figs. 2 and 5, the retriever tool 18 is lodged in a space provided between the shafts 11 and its extremities recessed in the slots 19.

To place in operating position, the tool 18 is grasped between the fingers and pulled out. Thereupon, as illustrated in Fig. 3, several telescoped sections, 20, 21, 22, 23, 24 and 25, projecting outwardly from the tube 15, are pulled out to provide a rod 26 of considerable length. Each succeeding section is slightly greater in diameter. After the lure retriever has been used, the rod 26 is reassembled by sliding or passing section 20 within section 21, section 21 within section 22, until the rod 26 is repositioned entirely within the tube 15 and the tool between and in the slots 19. The positioning of the relative parts upon reassembly will best be appreciated by the illustration appearing in Fig. 5. Thereupon, the cap 16 is repositioned over the tool 18 and the ends of the shafts 11.

As seen in Fig. 4, the tool 18 preferably constitutes a hook 27 and V-shaped yoke 28, fashioned in inverted relationship to each other. The hook 27 has its inner edge 29 straight and sharpened, so as to form with an opposite sharpened edge 30 a V-shaped knife edge, by means of which limbs or snags may be cut to release baits or lures.

The tool 18 may be secured at its middle 31 to the rod section 20. The yoke 28 is defined between the inclined edges 32 and 33. When a bait or lure is caught, the yoke 28 is caused readily to engage the line between the edges 32 and 33 and a forward or thrusting movement will cause the lure to be released from the log or similar object to which it is attached.

The device is provided with an attachment 34 which provides a means whereby the device may be securely hung or fastened to the harness or clothing of the user. It is preferred that the attachment 34 be secured about the cord 17 at 35.

Thus it is seen that the device described herein resolves a problem common to fishermen, yet in a manner which does not require additional or cumbrous equipment.

The present embodiment of the invention has been disclosed in considerable detail merely for the purpose of exemplification, since in actual practice it attains the features of advantage enumerated as desirable in the statement of the invention and the above description.

It is to be understood that by describing in detail herein any particular form, structure or arrangement, it is not intended to limit the invention beyond the terms of the claim, or the requirements of the prior art.

I claim:

A fish landing net comprising a frame, a net bag secured to said frame, said frame including end portions each provided with a slot, and a handle portion constituted by a stationary hollow tube attached to said end portions and a plurality of slidable inner tubes mounted for telescopic sliding in said stationary tube, each successive inner tube being slightly less in diameter than the tube in which it is mounted and a lure retrieving tool positioned on the end of the smallest of said tubes, said slots being adapted to receive portions of said tool.

References Cited in the file of this patent
UNITED STATES PATENTS 1,851,370    Munger _____ Mar. 29, 1932

FOREIGN PATENTS 251,462    Great Britain _____ May 6, 1926